(12) United States Patent
Shigeto et al.

(10) Patent No.: US 9,804,040 B2
(45) Date of Patent: Oct. 31, 2017

(54) SENSOR AND A METHOD OF MAKING THE SAME

(71) Applicant: TOYO TIRE & RUBBER CO., LTD., Osaka-shi, Osaka (JP)

(72) Inventors: Junichi Shigeto, Osaka (JP); Takeshi Fukuda, Osaka (JP); Hiroaki Ono, Osaka (JP); Zhiwei Luo, Hyogo (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 146 days.

(21) Appl. No.: 14/433,215

(22) PCT Filed: Oct. 16, 2013

(86) PCT No.: PCT/JP2013/078020
§ 371 (c)(1),
(2) Date: Apr. 2, 2015

(87) PCT Pub. No.: WO2014/061684
PCT Pub. Date: Apr. 24, 2014

(65) Prior Publication Data
US 2015/0253207 A1    Sep. 10, 2015

(30) Foreign Application Priority Data

Oct. 19, 2012  (JP) ................ 2012-232006
Oct. 19, 2012  (JP) ................ 2012-232009
Oct. 19, 2012  (JP) ................ 2012-232012

(51) Int. Cl.
*G01L 1/12*    (2006.01)
*G01B 7/28*    (2006.01)
(Continued)

(52) U.S. Cl.
CPC ............. *G01L 1/12* (2013.01); *B29C 35/02* (2013.01); *G01B 7/24* (2013.01); *G01B 7/28* (2013.01);
(Continued)

(58) Field of Classification Search
CPC ............. G01L 1/04; G01L 1/12; G01B 7/24
(Continued)

(56) References Cited

U.S. PATENT DOCUMENTS

2004/0265150 A1  12/2004  McElfresh et al.
2008/0036456 A1   2/2008  Kishida et al.
(Continued)

FOREIGN PATENT DOCUMENTS

EP    0093545 A2    11/1983
EP    0093546 A2    11/1983
(Continued)

OTHER PUBLICATIONS

"Sylgard 184 Silicone Elastomer: Product Information," Dow Corning.*
(Continued)

*Primary Examiner* — Benjamin Schmitt
(74) *Attorney, Agent, or Firm* — Westerman, Hattori, Daniels & Adrian, LLP

(57) ABSTRACT

The present invention provides a sensor including a tactile sensor and bending sensor and a method of making the same, of which the manufacturing cost is low, the production efficiency is high and the sensor sensitivity is improved. The present invention relates to a sensor including a tactile sensor and bending sensor composed of an elastomer containing a magnetic filler and a magnetic sensor that detects a magnetic change caused by deformation of the elastomer; and a method of making the same, of which the viscosity of the mixed solution of the thermosetting elastomer precursor solution with the magnetic filler is adjusted to a specified range.

16 Claims, 2 Drawing Sheets

(51) Int. Cl.
  G01L 1/04    (2006.01)
  G01B 7/24    (2006.01)
  B29C 35/02   (2006.01)
  B29K 75/00       (2006.01)
  B29K 83/00       (2006.01)
  B29K 505/12      (2006.01)
  B29L 31/00       (2006.01)

(52) U.S. Cl.
  CPC ............ *G01L 1/04* (2013.01); *B29K 2075/00* (2013.01); *B29K 2083/005* (2013.01); *B29K 2505/12* (2013.01); *B29L 2031/752* (2013.01)

(58) Field of Classification Search
  USPC ......... 73/862.621, 862.625, 862.636, 862.69
  See application file for complete search history.

(56) References Cited

U.S. PATENT DOCUMENTS

| | | |
|---|---|---|
| 2009/0218163 A1 | 9/2009 | Takeuchi et al. |
| 2010/0090691 A1 | 4/2010 | Kishida et al. |
| 2011/0184557 A1 | 7/2011 | Takeuchi et al. |

FOREIGN PATENT DOCUMENTS

| | | |
|---|---|---|
| JP | 59-000039 A | 1/1984 |
| JP | 62-046222 A | 2/1987 |
| JP | H01-184401 A | 7/1989 |
| JP | 10-290094 A | 10/1998 |
| JP | 2002-148004 A | 5/2002 |
| JP | 2005-292070 A | 10/2005 |
| JP | 2006-343650 A | 12/2006 |
| JP | 2008-039659 A | 2/2008 |
| JP | 2008-102090 A | 5/2008 |
| JP | 2009-019926 A | 1/2009 |
| JP | 2009-229453 A | 10/2009 |
| JP | 2009-258008 A | 11/2009 |
| WO | 2011/029575 A1 | 3/2011 |

OTHER PUBLICATIONS

Supplementary Partial European Search Report dated Jun. 7, 2016, issued in counterpart European Patent Application No. 13846523.2. (7 pages).

Extended (supplementary) European Search Report dated Sep. 7, 2016, issued in counterpart Application No. 13846523.2. (12 pages).

International Search Report dated Nov. 19, 2013, issued in corresponding application No. PCT/JP2013/078020.

Office Action dated Feb. 28, 2017, issued in counterpart Japanese Patent Application No. 2013-174591, with English translation. (5 pages).

Office Action dated Feb. 7, 2017, issued in counterpart Japanese Patent Application No. 2013-174589, with English transaltion. (8 pages).

Office Action dated Feb. 7, 2017, issued in counterpart Japanese Patent Application No. 2013-174595, with English translation. (10 pages).

\* cited by examiner

SENSOR AND A METHOD OF MAKING THE SAME

TECHNICAL FIELD

The present invention relates to a sensor that detects deformation caused by a contact with a magnetic elastomer containing magnetic fillers and a method of making the sensor. Particularly, the present invention relates to a tactile sensor that detects deformation caused by a contact with a magnetic elastomer, in which the magnetic filler is unevenly distributed in the magnetic elastomer; a bending sensor that detects bending deformation of a magnetic elastomer containing magnetic fillers; and a method of making them.

BACKGROUND OF THE INVENTION

Tactile sensors are widely used in various fields. Basically, they are sensors which detect intensity, a position, a direction and the like of a contact, when an object is in contact with another object. The tactile sensor is applied to a hand and skin of a robot, and is utilized as information to determine next action of the robot. In addition, the tactile sensor is utilized for detection of a sitting state on an automotive seat, a surface pressure distribution of a bed and a carpet, detection of a collision state of vehicles, detection of a motion state of organisms (for example, motion capture, detection of biological motion such as respiratory status, relaxed state of muscle), detection of intrusion into a restricted access area, foreign matter detection of a sliding door, a keyboard input device and the like. There are various proposals with respect to the tactile sensor and a method of making the tactile sensor (in Patent Documents 1 to 3).

Patent Document 1 discloses a pressure detection device comprising: a buffer member deformable by pressurizing and depressurizing including a magnet, and a sensor assembly for detecting a change in a magnetic field caused by deformation of a buffer portion with a magnetic sensor. The magnet present in the buffer member may be one large magnet (FIG. 1 of Patent Document 1) or small magnets uniformly dispersed (FIG. 7 and the like of Patent Document 1). In case of the one large magnet, there is a problem that it is difficult to detect the deformation due to touching, and a foreign body sensation is caused due to touching it. On the other hand, in case of the small magnets uniformly dispersed, since a phenomenon of canceling magnetic forces between magnet particles occurs even if the direction of the magnetic force of each magnet is the same as one another and the magnet near a contact surface moves but the magnet present inside the buffer member is difficult to move, there is a problem that detection sensitivity is poor when the external force is small and the deformation is very small.

Patent Document 2 discloses a detecting device comprising a viscoelastic magnet obtained by kneading and molding a magnet material and a viscoelastic material and magnetic-flux detecting means for detecting a change in a magnetic flux density vector due to deformation of the viscoelastic magnet. In the detecting device of Patent Document 2, since the magnet material is kneaded in the viscoelastic material, the magnet material is uniformly dispersed. Therefore, since a phenomenon of canceling magnetic forces between the magnet particles occurs and the magnet near a contact surface moves but the magnet present inside the buffer member is difficult to move, there is a problem that detection sensitivity is poor when an external force is small and the deformation is very small as described in Patent Document 1.

Patent Document 3 discloses a pressure-sensitive sensor comprising a magnetic sensor, an elastomer and permanent magnets sequentially laminated and fixed on the magnetic sensor, lead wires connected to input and output terminals of the magnetic sensor. In the pressure-sensitive sensor, since an elastic material is separated from a magnet-containing material, it is necessary to "sequentially laminate and fix" them, and there is a problem that peeling at an interface between the layers can be caused in addition to the necessity of a laminating step.

In addition, in a technical field of a robot or the other fields, for example, detection of a sitting state for an automotive, a surface pressure distribution of a bed or a carpet, detection of a collision state for vehicles, detection of a motion state of a living body (such as a motion capture, detection of a respiratory state, detection of a relaxed state of muscles and the like), trespass into a restricted area, foreign substance detection of a sliding door, a keyboard input device, it is necessary to detect a bending of an elastic body by a sensor. It is necessary to detect a bending of an elastomer corresponding to a skin of a humanoid robot, when controlling a motion of the humanoid robot and responding to an external pressure. Many sensors detecting the bending deformation and methods for making them have been proposed (Patent Documents 4, 5 and the like).

Patent Document 4 discloses deformation sensor having transparency, which is a flexible element comprising a non-aqueous polymeric solid electrolyte containing a polymer component which is selected from a polymer containing a monomer unit having a heteroatom or a block copolymer containing a block of the polymer and an ionic liquid, and at least a pair of electrodes, wherein the flexible element has a total light transmittance of not less than 70% and deformation of the flexible element generates an electromotive force. It is necessary to mount the electrodes directly to the flexible element for measuring the electromotive force, and there is a problem that peeling at a bonding surface between the element and electrode is easily caused.

Patent Document 5 discloses a magnetic angle sensor which can maintain detection accuracy of the angle by preventing a magnetic dust from an invasion of a magnetic dust in a magnetic gap of the magnetic dust. Since a solid magnet disk is used, there is a problem that it has no flexibility.

PRIOR ART

Patent Documents

Patent Document 1: JP 2009-229453 A
Patent Document 2: JP 2008-39659 A
Patent Document 3: JP 62-46222 A
Patent Document 4: JP 2009-258008 A
Patent Document 5: JP 2009-19926 A

OBJECTS OF THE INVENTION

The object of the present invention is to solve the above mentioned problems and to provide:

a tactile sensor having an improved sensor sensitivity by using a magnetic filler which is not uniformly distributed and is unevenly distributed on one side, a bending sensor having a flexibility and high sensitivity by dispersing or unevenly distributing a magnetic filler in an elastomer and detecting the magnetic filler using two or more magnetic sensors, and a method of making the sensors having low manufacturing cost and high production efficiency because manufacturing processes are not complicated by forming the elastomer containing one layer of the magnetic filler which it is not necessary to laminate it.

The present inventors have intensely studied solutions for solving the above mentioned problems and have found that it is possible to provide:

a tactile sensor having an improved sensor sensitivity by using a magnetic filler which is not uniformly distributed and is unevenly distributed on one side, a bending sensor having a flexibility and high sensitivity by dispersing or unevenly distributing a magnetic filler in an elastomer and detecting the magnetic filler using two or more magnetic sensors, and a method of making a sensor having low manufacturing cost, high production efficiency and high sensor sensitivity by adjusting a viscosity of a mixed solution to a specified range in the method comprising the steps of:

mixing a magnetic filler and a thermosetting elastomer precursor solution to form a mixed solution, molding the mixed solution into a sheet, unevenly distributing the magnetic filler in the thermosetting elastomer precursor solution, heating and curing the thermosetting elastomer precursor solution, and magnetizing the magnetic filler to form a magnetic elastomer. The present invention has been completed based on the above finding.

SUMMARY OF THE INVENTION (1) The present invention relates to includes a tactile sensor comprising:

an elastomer containing a magnetic filler, and a magnetic sensor that detects a magnetic change caused by deformation of the elastomer due to touching, wherein the magnetic filler is unevenly distributed in the elastomer and an uneven distribution degree of the magnetic filler in the elastomer is within the range of 1 to 100.

In order to suitably carry out the present invention, it is desired that:

the magnetic filler is unevenly distributed on one side of the elastomer and an uneven distribution surface is used as a contact surface;

the magnetic filler is rare earth-based, Fe-based, Co-based, Ni-based, or an oxide-based filler, and has an average particle size of 0.02 to 500 μm;

the magnetic filler is added in an amount of 1 to 450 parts by mass, based on 100 parts by mass of the elastomer; and the elastomer is a polyurethane elastomer or a silicone elastomer.

(2) The present invention relates to a bending sensor comprising:

an elastomer containing a magnetic filler, and two or more magnetic sensors that detect a magnetic change caused by a bending deformation of the elastomer.

In order to suitably carry out the present invention, it is desired that:

the magnetic filler is unevenly distributed in the elastomer and an uneven distribution degree of the magnetic filler in the elastomer is within the range of 1 to 100;

the magnetic filler is unevenly distributed on one side of the elastomer and the two or more magnetic sensors are placed on the opposite side of an uneven distribution surface;

the magnetic filler is rare earth-based, Fe-based, Co-based, Ni-based, or an oxide-based filler, and has an average particle size of 0.02 to 500 μm;

wherein the magnetic filler is added in an amount of 1 to 450 parts by mass, based on 100 parts by mass of the elastomer; and the elastomer is a polyurethane elastomer or a silicone elastomer.

(3) Furthermore, the present invention relates to a method of making a sensor comprising an elastomer containing a magnetic filler and a magnetic sensor, the method comprising the steps of:

(i) mixing the magnetic filler and a thermosetting elastomer precursor solution to form a mixed solution, (ii) molding the mixed solution into a sheet, (iii) unevenly distributing the magnetic filler in the thermosetting elastomer precursor solution, (iv) heating and curing the thermosetting elastomer precursor solution to form an elastomer sheet, and (v) magnetizing the magnetic filler to form a magnetic elastomer, wherein the mixed solution formed in the step (i) has a viscosity of 100 to 50,000 mPa·sec, an uneven distribution degree of the magnetic filler unevenly distributed in the step (iii) in the elastomer is within the range of 1 to 100.

In order to suitably carry out the present invention, it is desired that:

the step (iii) of unevenly distributing the magnetic filler is performed by applying a magnetic field having a magnetic flux density of 1 to 3000 mT;

the magnetic filler is unevenly distributed on one side and the magnetic sensor is placed on the opposite side of an uneven distribution surface;

the magnetic filler is rare earth-based, Fe-based, Co-based, Ni-based, or an oxide-based filler, and has an average particle size of 0.02 to 500 μm;

the magnetic filler is added in an amount of 1 to 450 parts by mass, based on 100 parts by mass of the elastomer;

the elastomer is a polyurethane elastomer or a silicone elastomer; and the uneven distribution degree is within the range of 2 to 90.

EFFECTS OF THE INVENTION (1) According to the tactile sensor of the present invention, since the magnetic filler is not uniformly distributed, it is unevenly distributed and the uneven distribution degree of the magnetic filler in the elastomer is within the range of 1 to 100, magnetic forces between the magnetic fillers are not canceled and many magnetic fillers are present near the contact surface. Therefore, since many magnetic fillers are displaced by small external force, even if an external force is small and deformation thereby is very small, it is possible to easily detect it using the magnetic sensor.

In addition, according to the tactile sensor of the present invention, since the elastomer is not separated from the magnetic filler-containing material, it is possible to produce the tactile sensor at low cost and easily without the peeling between layers. The uneven distribution of the magnetic filler can be performed by standing it for a given time after mixing a raw material of elastomer with magnetic fillers or by placing a magnet on one side during the mixing to unevenly distribute the magnetic fillers due to gravitation when the magnetic filler is already magnetized. Therefore, the production method is simple and easy and is not complicated due to increasing unnecessary operations. A method other than the above, for example, a method of unevenly distributing the magnetic fillers by centrifugal processing can be used.

(2) According to the bending sensor of the present invention, since the magnetic fillers are dispersed in the elastomer, it is possible to detect a bending at high precision by detecting a bending state of the elastomer with two or more magnetic sensors, particularly three or more magnetic sensors.

In addition, in the bending sensor of the present invention, since the magnetic fillers can be unevenly distributed in the elastomer and a uneven distribution degree thereof is within the range of 1 to 100, a phenomenon of canceling magnetic forces between the magnet fillers does not occurs and magnetic forces are arranged in the same direction on the contrary. Therefore, detection with the bending sensor can be easily performed even if the degree of bending is small and thereby the deformation is very small.

(3) According to the method of making a sensor of the present invention, since the magnetic filler is not uniformly distributed and is unevenly distributed in the elastomer, magnetic forces between the magnetic fillers are not canceled and many magnetic fillers are present near the contact surface. Therefore, since many magnetic fillers are displaced by small external force, the sensor sensitivity is high and even if an external force is small and deformation thereby is very small, it is possible to easily detect it using the magnetic sensor.

In addition, in the method of making a sensor of the present invention, since the elastomer is not separated from the magnetic filler-containing material, a step of laminating layers thereof is not necessary and there is no problem that peeling at an interface between the layers can be caused, thereby the manufacturing cost is low and the production efficiency is high.

DEFINITION OF TERMS

The "degree of uneven distribution" as used herein is a number value representing a degree which the magnetic filler is unevenly distributed in the elastomer, and it is measured by the following methods. A sample is cut from the prepared magnetic elastomer with a razor blade, a cross-section of the sample is observed using a digital microscope at a magnification of 100. Using an image analysis software ("WinROOF" from Mitani Corporation), the obtained image is divided into three equal parts in the thickness direction, that is, an upper layer, a middle layer and a lower layer, and the number of particles of magnetic filler in each layer is counted. An abundance ratio of the magnetic filler in each layer is determined by calculating a ratio of the number of particles of each layer to that of the middle layer. In addition, the uneven distribution degree is determined by calculating a value of [(the abundance ratio of the magnetic filler in the upper layer)–(the abundance ratio of the magnetic filler in the lower layer)]. The upper layer is the layer on the side of the contact surface in the sensor formed by using a magnetic elastomer, in which magnetic fillers are unevenly distributed. When the value of the degree of uneven distribution is higher, the magnetic filler is more unevenly distributed.

DESCRIPTION OF THE PREFERRED EMBODIMENTS (Tactile Sensor)

Figure 1:
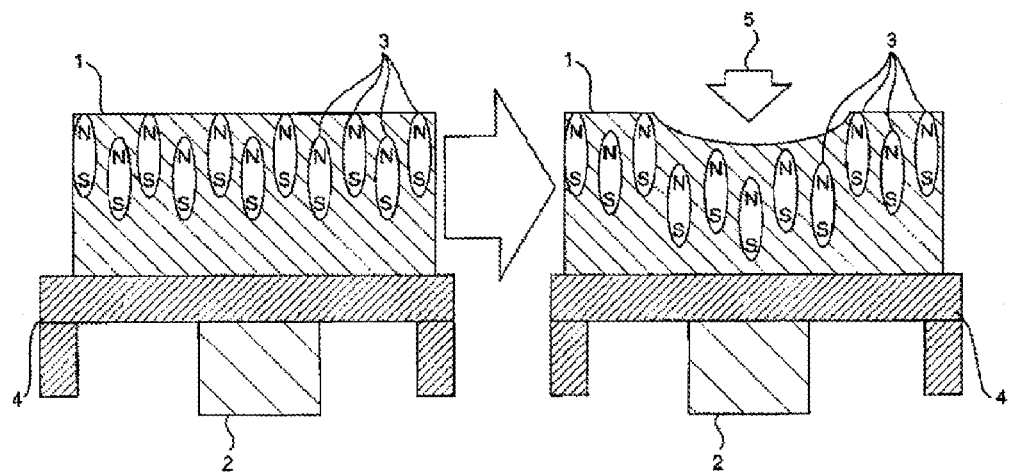
FIG. 1 is a schematic cross section illustrating one embodiment of the tactile sensor of the present invention, which schematically illustrates the change between the state that no pressure is applied thereon and the state that pressure is applied thereto.

The tactile sensor of the present invention will be described with reference to FIG. 1. FIG. 1 is a schematic cross section illustrating one embodiment of the tactile sensor of the present invention, which schematically illustrates the change between the state that no pressure is applied thereon (left figure of FIG. 1) and the state that pressure is applied thereto (right figure of FIG. 1).

The tactile sensor of the present invention is basically composed of an elastomer 1 and a magnetic sensor 2. The elastomer 1 comprises a plurality of magnetic fillers 3, in which the magnetic fillers 3 are unevenly distributed in the upper side of FIG. 1 and the degree of uneven distribution thereof is within the range of 1 to 100 in the present invention. As shown in FIG. 1, the substrate 4 is present between the elastomer 1 and the magnetic sensor 2. The substrate 4 need not exist, but it is usually necessary in order to support the elastomer 1. Further, if the substrate 4 does not exist, the whole of the elastomer 1 is bended when the pressure 5 is applied to the elastomer 1, and there is a possibility that it is impossible to accurately detect the pressure 5.

A state that no pressure is applied on the elastomer is shown in the left figure of FIG. 1 and a state that pressure is applied thereto is shown in the right figure of FIG. 1. When the elastomer 1 is deformed by the pressure 5, a position of the magnetic fillers 3 is lowered in the downward direction only at a portion, on which the pressure is applied. A magnetic field from the magnetic fillers 3 is changed by the change of the position of the magnetic fillers 3 in the downward direction, and thereby it is detected by the magnetic sensor 2.

When the pressure 5 is strong force, the change of the position of the magnetic fillers 3 is large. On the other hand, when the pressure 5 is small, the position change of the magnetic filler 3 is small, and an intensity of the pressure 5 can be also measured by a change of a magnetic field thereby. Further, the pressure 5 in a vertical direction can be detected with one magnetic sensor 5, but the pressure from an oblique direction can be also detected by optimizing the number and arrangement of the magnetic sensors.

It is preferable that the magnetic fillers 3 are unevenly distributed on one side of the elastomer 1 and the uneven distribution surface is used as a contact surface. In the embodiment shown in FIG. 1, the uneven distribution surface is used as a contact surface. In the embodiment, the displacement of the magnetic filler 3 is large, and detection is easily performed.

(Bending Sensor)

Figure 2:
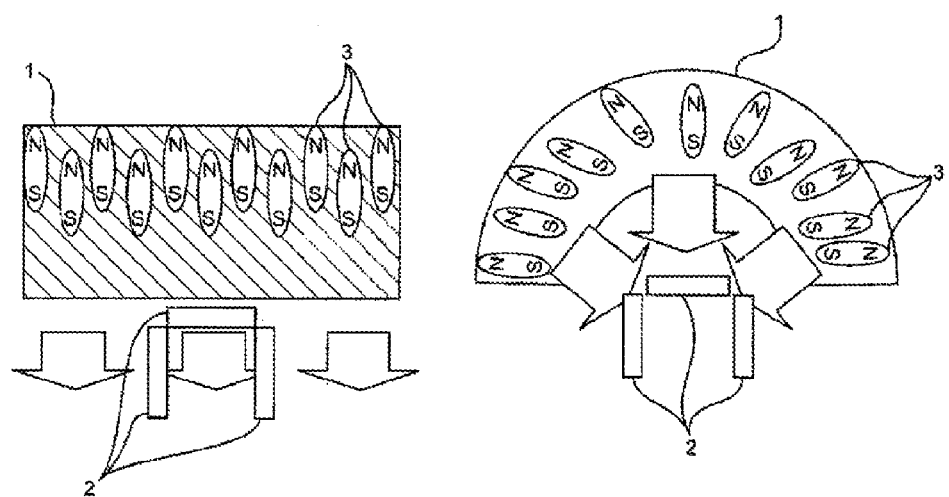
FIG. 2 is a schematic cross section illustrating one embodiment of the bending sensor of the present invention, which schematically illustrates the state that it is not bended and the state that it is bended.
Figure 3:
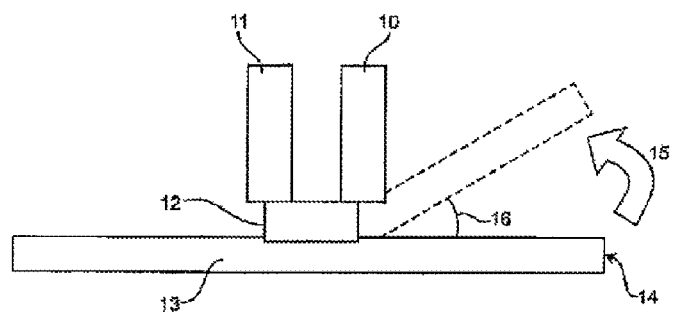
FIG. 3 is a schematic diagram illustrating the positional relationship between the elastomer and three magnetic sensors in the test method of the bending properties used in the examples.
Figure 4:
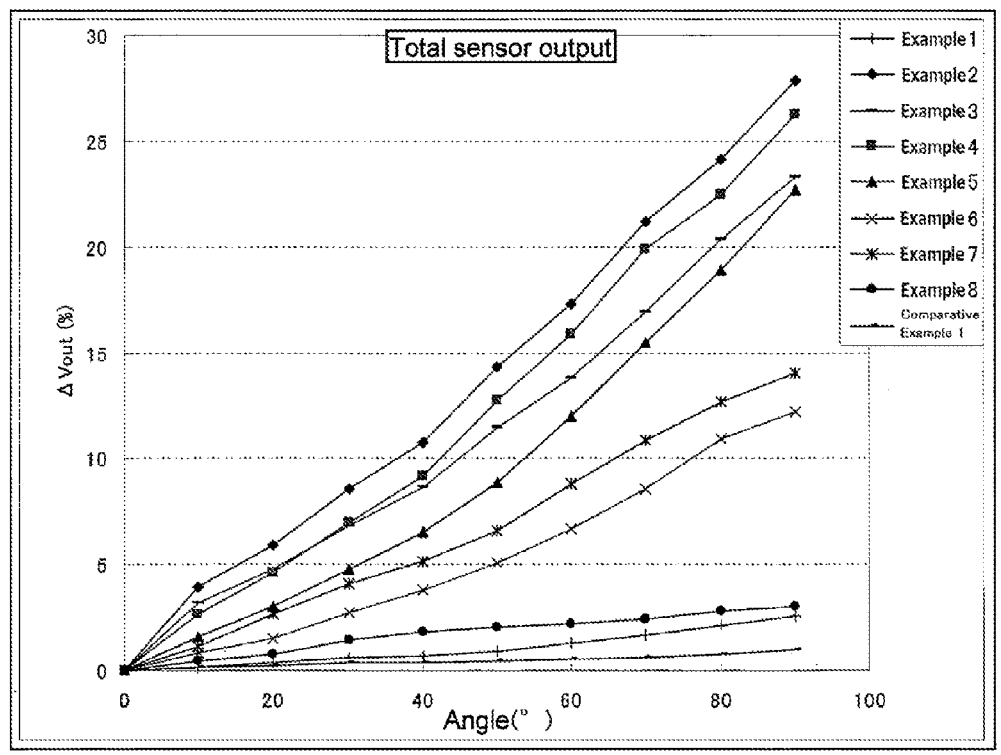
FIG. 4 is a graph illustrating the relationship between the bended angle of the elastomer and the sum of a change rate value of the output voltage of each magnetic sensor (total output of the sensor; $\Delta V_{out}$) in the bending sensors of Examples and Comparative Examples.

The bending sensor of the present invention will be described with reference to FIG. 2. FIG. 2 is a schematic cross section illustrating one embodiment of the bending sensor of the present invention, which schematically illustrates the state that it is not bended (left figure of FIG. 2) and the state that it is bended (right figure of FIG. 2). Further, FIG. 3 and FIG. 4 are described in Examples.

The bending sensor of the present invention is basically composed of an elastomer 1 and a magnetic sensor 2. The elastomer 1 comprises a plurality of magnetic fillers 3, in which the magnetic fillers 3 are unevenly distributed in the upper side of FIG. 2 and the degree of uneven distribution thereof is within the range of preferably 1 to 100 in the present invention. Three magnetic sensors 2 are shown in FIG. 2, but the bending sensor of the present invention comprises two or more magnetic sensors. When the bending sensor comprises three or more magnetic sensors 2, detection accuracy is improved.

The state that the elastomer 1 is not bended is shown in the left figure of FIG. 2 and the state that the elastomer 1 is bended in a fan-shape is shown in the right figure of FIG. 2. The elastomer 1 is deformed, and the position of the magnetic fillers 3 is greatly different. A magnetic field from the magnetic fillers 3 is changed by the change of the magnetic fillers 3, and thereby it is detected by the magnetic sensor 2.

When the bending is large, the change of the position of the magnetic filler 3 is large. On the other hand, when the bending is small, the change of the position of the magnetic filler 3 is small. The degree of bending can be determined by a change of magnetic field thereby.

It is preferable that the magnetic fillers 3 are unevenly distributed on one side of the elastomer 1 and the uneven distribution surface is used as an outer surface. In the embodiment shown in FIG. 2, the uneven distribution surface is used as an outer surface. In the embodiment, the displacement of the magnetic filler 3 is large, and detection is easily performed.

(Method of Making a Sensor)

It is required that the method of making a sensor including the tactile sensor and bending sensor of the present invention composing an elastomer containing a magnetic filler and a magnetic sensor comprises the steps of:

(i) mixing the magnetic filler and a thermosetting elastomer precursor solution to form a mixed solution, (ii) molding the mixed solution into a sheet, (iii) unevenly distributing the magnetic filler in the thermosetting elastomer precursor solution, (iv) heating and curing the thermosetting elastomer precursor solution to form an elastomer sheet, and (v) magnetizing the magnetic filler to form a magnetic elastomer.

In the present invention, it is required that the mixed solution formed in the step (i) has a viscosity of 100 to 50,000 mPa·sec, preferably 200 to 45,000 mPa·sec. When the viscosity of the mixed solution is lower than 100 mPa·sec, a concentration of the filler is reduced, and the sensor sensitivity is low. On the other hand, when the viscosity of the mixed solution is higher than 50,000 mPa·sec, the movement of the magnetic fillers is prevented, and the uneven distribution degree thereof is reduced.

Further, in the present invention, it is required that the uneven distribution degree of the magnetic filler unevenly distributed in the step (iii) in the elastomer is within the range of 1 to 100, preferably 2 to 90, more preferably 3 to 80. When the uneven distribution degree is smaller than 1, the magnetic filler is not much unevenly distributed in the magnetic elastomer, and there is a possibility that it is difficult to detect the displacement of the magnetic filler with the magnetic sensor because magnetic forces are canceled and the displacement of the magnetic fillers in the elastomer is small as described in the background of the invention. On the other hand, when the uneven distribution degree is 100, all of the magnetic fillers are present on the contact surface of the elastomer and it is preferable, but the uneven distribution degree is actually smaller than 100 in most cases. The uneven distribution degree of the magnetic fillers in the elastomer is determined by the measurement described in Definition of terms.

Examples of the magnetic fillers used in the present invention include rare earth-based, iron-based, cobalt-based, nickel-based and oxide-based, and all of these may be used. The rare earth-based magnetic filler, by which high magnetic force is obtained, is preferable, but it is not limited thereto. The shape of the magnetic filler is not particularly limited, and may be spherical shape, flat shape, needle shape, columnar shape or undetermined shape. The magnetic filler has an average particle diameter of 0.02 to 500 μm, preferably 0.1 to 400 μm, more preferably 0.5 to 300 μm. When the average particle diameter of the magnetic filler is smaller than 0.02 μm, the magnetic properties of the magnetic filler is poor. On the other hand, when the average particle diameter of the magnetic filler is larger than 500 μm, the mechanical properties of the magnetic elastomer is poor (brittle).

The amount of the magnetic filler is within the range of 1 to 450 parts by mass, preferably 2 to 400 parts by mass, per 100 parts by mass of the elastomer. When the amount of the magnetic filler is smaller than 1 part by mass, it is difficult to detect the change in the magnetic field. On the other hand, when the amount of the magnetic filler is larger than 450 parts by mass, the elastomer itself is brittle, and the desired properties cannot be obtained.

As an elastomer used in the magnetic elastomer of the present invention, general elastomers may be used, but a thermosetting elastomer is preferable in consideration of the properties such as compression set. As the thermosetting elastomer used in the present invention, preferably polyurethane elastomer or silicone elastomer is suitable. In case of the polyurethane elastomer, a mixed solution is obtained by mixing an active hydrogen-containing compound, a solvent and magnetic filler to form a mixture, and then mixing an isocyanate component with the mixture. The mixed solution may be obtained by mixing the solvent and filler with the isocyanate component to form a mixture, and then mixing the active hydrogen-containing compound with the mixture.

In case of the silicone elastomer, a mixed solution is obtained by mixing a solvent and magnetic filler with a precursor of the silicone elastomer. For example, in case of a two-component silicone elastomer consisting of two components of a main agent component and curing agent component, a mixed solution is obtained by mixing by mixing the main agent component, solvent and magnetic filler to form a mixture and then mixing the curing agent component with the mixture. In addition, the mixed solution may be obtained by mixing the solvent and filler with the curing agent component to a mixture, and then mixing the main agent component with the mixture.

In the case of the polyurethane elastomer, the isocyanate component and active hydrogen-containing compound, which can be used in the present invention, are as follows.

The isocyanate component is not particularly limited, but compounds known in the field of polyurethane can be used. Examples of the isocyanate components include aromatic diisocyanates such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, 1,5-naphthalene diisocyanate, p-phenylene diisocyanate, m-phenylene diisocyanate, p-xylylene diisocyanate, and m-xylylene diisocyanate; aliphatic diisocyanates such as ethylene diisocyanate, 2,2,4-trimethyl hexamethylene diisocyanate, 1,6-hexamethylene diisocyanate; cycloaliphatic diisocyanates such as 1,4-cyclohexane diisocyanate, 4,4'-dicyclohexylmethane diisocyanate, isophorone diisocyanate, norbornane diisocyanate; and the like. These isocyanate components may be used alone or in combination of two or more thereof. In addition, the isocyanate may be an urethane-modified, allophanate-modified, biuret-modified or isocyanurate-modified isocyanate. The isocyanates may be a prepolymer with the polyol described later.

As the active hydrogen-containing compound, active hydrogen-containing compounds conventionally used in the polyurethane art can be used. Examples of the active hydrogen-containing compounds include, for example, polyether polyols such as polytetramethylene ether glycol, polyethylene glycol; polyester polyols such as polybutylene adipate; polyester polycarbonate polyols such as a reactant of alkylene carbonate with polyester glycols (such as polycaprolactone polyester, polycaprolactone); polyester polycarbonate polyols obtained by reacting ethylene carbonate with a polyhydric alcohol to form a reaction mixture, and then reacting the reaction mixture with an organic dicarboxylic acid; polycarbonate polyols obtained by a transesterification reaction of a polyhydroxyl compound and aryl carbonate; and the like. These active hydrogen-containing compounds may be used alone or in combination of two or more thereof.

A low molecular weight polyol component and low molecular weight polyamine component may be used in addition to the high molecular weight polyol components described above as the active hydrogen-containing compound, Examples of the low molecular weight polyol components include ethylene glycol, 1,2-propylene glycol, 1,3-propylene glycol, 1,4-butanediol, 1,6-hexanediol, neopentyl glycol, 1,4-cyclohexanedimethanol, 3-methyl-1,5-pentanediol, diethylene glycol, triethylene glycol, 1,4-bis(2-hydroxyethoxy) benzene, trimethylolpropane, glycerin, 1,2,6-hexane triol, pentaerythritol, tetramethylol cyclohexane, methyl glucoside, sorbitol, mannitol, dulcitol, sucrose, 2,2,6,6-tetrakis(hydroxymethyl)cyclohexanol and triethanolamine. Examples of the low molecular weight polyamine components include ethylene diamine, tolylene diamine, diphenylmethane diamine and diethylenetriamine. These active hydrogen-containing compounds may be used alone or in combination of two or more thereof. It is possible to further mix polyamines. Examples of the polyamines include 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluene diamine, 3,5-bis(methylthio)-2,6-toluene diamine, 3,5-diethyl toluene-2,4-diamine, 3,5-diethyl toluene-2,6-diamine, trimethylene glycol-di-p-aminobenzoate, polytetramethyleneoxide-di-p-aminobenzoate, 1,2-bis(2-aminophenyl)ethane, 4,4'-diamino-3,3'-diethyl-5,5'-dimethyldiphenylmethane, N,N'-di-sec-butyl-4,4'-diaminodiphenylmethane, 4,4'-diamino-3,3'-diethyldiphenylmethane, 4,4'-diamino-3,3'-diisopropyl-5,5'-dimethyldiphenylmethane, 4,4'-diamino-3,3',5,5'-tetraethyldiphenylmethane, 4,4'-diamino-3,3',5,5'-tetraisopropyldiphenylmethane, m-xylylene diamine, N,N'-di-sec-butyl-p-phenylenediamine, m-phenylenediamine and p-xylylene diamine.

When the silicone elastomer is used as the thermosetting elastomer, it not particularly limited as long as it is a liquid type, but a two-component silicone elastomer is preferred from the viewpoint of the workability of the step of unevenly distributing the magnetic fillers described later. Examples of the silicone elastomers, which can be used in the present invention, include two-component liquid silicone elastomers, which are commercially available under the trade names of "DY35-1106", "CY52-276", "EG-3000" and "EG-3100" from Dow Corning Toray Co., Ltd.; two-component liquid silicone elastomers, which are commercially available under the trade names of "KE-104Gel Cat-104", "KE-1051 (A/B)", "KE-1052 (A/B)" and "KE-110Gel Cat-110" from Shin-Etsu Chemical Co., Ltd.; and the like.

In addition, the mixed solution formed in the above step (i) may contain a solvent for viscosity adjustment. Examples of the solvents, which are not particularly limited, include toluene, xylene, tetrahydrofuran, 1,4-dioxane, acetone, methyl ethyl ketone, ethyl acetate, butyl acetate, N, N-dimethylformamide, N, N-dimethylacetamide, n-methyl-pyrrolidone and the like. The amount of the solvent in the mixed solution is within the range of 15 to 200 parts by mass, preferably 20 to 190 parts by mass per 100 parts by mass of the elastomer. When the amount of the solvent is smaller than 15 parts by mass, the mixed solution has high viscosity, and the handling property is poor. On the other hand, when the amount of the solvent is larger than 200 parts by mass, a large amount of energy is required to evaporate the solvent from the elastomer after curing.

In addition, the mixed solution formed in the above step (i) may contain a plasticizer for viscosity adjustment. Examples of the plasticizers, which are not particularly limited, include dioctyl phthalate, diisononyl phthalate, diisodecyl phthalate, dibutyl phthalate, dioctyl adipate, diisononyl adipate, trioctyl trimellitate, tricresyl phosphate, acetyl tributyl citrate, epoxidized soybean oil, epoxidized linseed oil and the like. The amount of the plasticizer is within the range of 15 to 200 parts by mass, preferably 20 to 190 parts by mass per 100 parts by mass of the elastomer. When the amount of the plasticizer is smaller than 15 parts by mass, the mixed solution has high viscosity, and the handling property is poor. On the other hand, when the amount of the plasticizer is larger than 200 parts by mass, the plasticizer may bleed from the elastomer.

Methods for performing the mixing of the step (i) include a method performed with a general mixer which can mix the liquid resin with the filler, such a homogenizer, a dissolver, biaxial planetary mixer and the like.

In the step (ii) of the method of the present invention, methods of molding the mixed solution into a sheet are not particularly limited, for example, include a batch type molding method which is performed by injecting the mixed solution into a mold treated with a release agent and then curing it; a continuous molding method which is performed by continuously feeding the mixed solution onto a surface material treated with a release agent and then curing it.

In the method of the present invention, it is required to comprise the step of unevenly distributing the magnetic filler in the thermosetting elastomer precursor solution in the step (iii). The methods of unevenly distributing the magnetic filler include a method of unevenly distributing the magnetic filler on the lower surface by the precipitation due to the magnetic filler's own weight, while the mixed solution stands for 0.1 to 180 minutes at a room temperature or a given temperature such as −10 to 50° C., after molding the mixed solution containing the magnetic filler into the sheet. In addition, the step of unevenly distributing the magnetic filler may be performed by using a physical force, such as a centrifugal force or magnetic force. As the method by using the magnetic force, there is a method of unevenly distributing the magnetic filler by applying a magnetic field having a magnetic flux density of 1 to 3000 mT. When the magnetic flux density is smaller than 1 mT, the magnetic attraction acting on the magnetic filler is weak, and it is difficult to move the magnetic filler, thereby the uneven distribution degree is reduced. On the other hand, it is also possible to apply a magnetic force of larger than 3000 mT, the uneven distribution degree of the magnetic filler is not improved even if applying a magnetic field having a magnetic flux density of larger than 3000 mT.

In the step (iv) of the method of the present invention, the curing conditions are not particularly limited, but the step is performed preferably at 60 to 200° C. for 10 minutes to 24 hours. When the curing temperature is too high, the elastomer is thermally degraded, and the mechanical strength is reduced. On the other hand, when the curing temperature is too low, the curing of the elastomer is insufficient. In addition, when the curing time is too long, the elastomer is thermally degraded, and the mechanical strength is reduced. On the other hand, when the curing time is too short, curing of the elastomer is insufficient.

In the step (v) of the method of the present invention, the method of magnetizing the magnetic filler is not particularly limited, but it can be performed with a magnetization device conventionally used, for example, "ES-10100-15SH" manufactured by Denshijiki industry Co., Ltd., "TM-YS4E" manufactured by Tamagawa Co., Ltd. and the like. The step (v) is performed by generally applying a magnetic field having a magnetic flux density of 1 to 3 T. The magnetic filler may be added to the elastomer precursor solution after magnetization. However, it is preferable to magnetize the magnetic filler after the addition thereof to the elastomer precursor solution, because the magnets are oriented to the same direction as shown in FIG. 1 and FIG. 2 to easily detect the magnetic force or the magnetic filler is easily handled in the steps.

As shown in FIG. 1, the tactile sensor of the present invention is comprised of the magnetic elastomer obtained by the steps (i) to (v) of the method of the present invention and the magnetic sensor. As the sensor of the present invention, the bending sensor comprising the magnetic elastomer and a plurality of the magnetic sensor as shown in FIG. 2 is also within the scope of the present invention.

The magnetic sensor 2 may be generally a sensor used to detect the change of the magnetic field. Examples of the magnetic sensors include a magnetoresistive element (for example, a semiconductor compound magnetoresistive element, an anisotropic magnetoresistive element (AMR), giant magnetoresistive element (GMR) or a tunnel magnetoresistive element (TMR), a Hall element, an inductor, MI element, a flux gate sensor and the like. From the viewpoint of the sensitivity, the Hall element is preferably used.

EXAMPLES

The following Examples and Comparative Examples further illustrate the present invention in detail, but are not to be construed to limit the scope of the present invention.

(Tactile Sensor)

Example 1

In the reaction vessel, 40 parts by mass of polypropylene glycol commercially available from Asahi Glass Co., Ltd. under the trade name of "Preminol 7001" (a number average molecular weight 6000), and 60 parts by mass of polypropylene glycol commercially available from Asahi Glass Co., Ltd. under the trade name "Excenol 3020" (a number average molecular weight 3000) were put, and dehydrated under reduced pressure for 1 hour while stirring. The inside of the reaction vessel was purged with nitrogen gas. To the reaction vessel, 10 parts by mass of tolylene diisocyanate (which is TDI-80 commercially available from Mitsui Chemicals, Inc. under the trade name of "Cosmonate T-80"; a mixture of 2,4-tolylene diisocyanate/2,6-tolylene diisocyanate=80/20) was added, and then was reacted for 5 hours while the temperature in the reaction vessel was maintained at 80° C. to synthesize an isocyanate terminated prepolymer.

Next, as shown in the following Table 1, 33 parts by mass of polypropylene glycol commercially available from Asahi Glass Co., Ltd. under the trade name of "Preminol 7001" (a number average molecular weight 6000), 8 parts by mass of polypropylene glycol commercially available from Asahi Glass Co., Ltd. under the trade name "Excenol 1020" (a number average molecular weight 1000), 0.06 parts by mass of lead octoate (commercially available from Toei Chemical Industry Co., Ltd.) as a catalyst, 100 parts by mass of a magnetic filler (neodymium-based magnetic powder, which is commercially available from Aichi Steel Corporation under the trade name of "MF-15P"; an average particle diameter 133 μm) and 120 parts by mass of toluene were premixed, and degassed under reduced pressure to obtain a premixed solution. In addition, 59 parts by mass of the prepolymer was degassed under reduced pressure while heating to 80° C. Subsequently, the pre-mixture solution and the prepolymer were mixed and degassed in a hybrid mixer ("HM-500" manufactured by Keyence Corporation) to obtain a mixed solution. The mixed solution was casted into a mold treated with a release agent and a polyethylene terephthalate film treated with a release agent was covered thereon, and then the thickness was adjusted to 1 mm with a nip roll. The magnetic fillers were precipitated by standing still at room temperature for 120 minutes as a treatment of unevenly distributing the magnetic fillers. And then the curing was performed for 1 hour by putting the mold in an oven at 80° C. to obtain a urethane elastomer. A urethane magnetic elastomer was obtained by magnetizing the resulting elastomer sheet with a magnetization device (manufactured by Denshijiki industry Co., Ltd.) at 1.3 T.

With respect to the polyurethane elastomer, the uneven distribution degree of the magnetic filler was measured according to the evaluation method of the uneven distribution degree described later. In addition, by using a Hall element as a magnetic sensor, the properties of the tactile sensor were evaluated according to the evaluation method of the tactile sensor properties described later. The results thereof are shown in the following Table 1. With respect to the uneven distribution degree, the unevenly distributing treatment time is also shown in Table 1.

Example 2

A urethane elastomer was obtained as described in Example 1 except for using a samarium-based magnetic powder (SmFeN-alloy fine powder manufactured from Sumitomo Metal Mining Co., Ltd.; an average particle diameter 2.5 μm) as a magnetic filler.

With respect to the resulting urethane elastomer, the uneven distribution degree and sensor sensitivity were measured as described in Example 1. The results thereof are shown in Table 1.

Example 3

In the reaction vessel, 50 parts by mass of a main agent of two-component liquid silicone rubber commercially available from Dow Corning Toray Co., Ltd. under the trade name of "DY35-1106A" as a silicone precursor, 100 parts by mass of the magnetic filler and 60 parts by mass of toluene were put, and dehydrated under reduced pressure at room temperature for 60 minutes while stirring to obtain a premixed solution. In another reaction vessel, 50 parts by mass of a curing agent of two-component liquid silicone rubber commercially available from Dow Corning Toray Co., Ltd. under the trade name of "DY35-1106B" as another silicone precursor and 60 parts by mass of toluene were put, and dehydrated under reduced pressure for 60 minutes while stirring to obtain another premixed solution. Subsequently, the two pre-mixture solutions were mixed and degassed in a hybrid mixer to obtain a mixed solution. The mixed solution was dropped on a mold treated with a release agent and a polyethylene terephthalate film treated with a release agent was covered thereon, and then the thickness was adjusted to 1 mm with a nip roll. The magnetic fillers were precipitated by standing still at room temperature for 120 minutes as a treatment of unevenly distributing the magnetic fillers. And then the curing was performed for 15 minutes by putting the mold in an oven at 120° C., followed by further curing for 4 hours at 200° C. to obtain a silicone elastomer sheet.

A silicone magnetic elastomer was obtained by magnetizing the resulting silicone elastomer sheet with a magnetization device (manufactured by Denshijiki industry Co., Ltd.) at 1.3 T.

With respect to the resulting silicone elastomer, the uneven distribution degree and sensor sensitivity were measured as described in Example 1. The results thereof are shown in Table 1.

Example 4

A silicone elastomer, of which the uneven distribution degree of the magnetic filler was changed, was obtained by using the same raw material as that of Example 3 except for 60 parts by mass of toluene and standing at room temperature for 60 minutes as a treatment of unevenly distributing the magnetic fillers.

With respect to the resulting silicone elastomer, the uneven distribution degree and sensor sensitivity were measured as described in Example 1. The results thereof are shown in Table 1.

Comparative Example 1

A silicone elastomer, of which the uneven distribution degree of the magnetic filler was reduced, was obtained by using the same raw material as that of Example 3 except that the standing as a treatment of unevenly distributing the magnetic fillers was not performed. The diluent was used in order to improve the mixing property.

With respect to the resulting silicone elastomer, the uneven distribution degree and sensor sensitivity were measured as described in Example 1. The results thereof are shown in Table 1.

Comparative Example 2

With Labo Plastomill ("4C150-01" manufactured by Toyo Seiki Seisakujyo), 100 parts by mass of a millable type (heat curing type) silicone rubber commercially available from Dow Corning Toray Co., Ltd. under the trade name of "DY32-1000U", 0.8 parts by mass of a crosslinking agent commercially available from Dow Corning Toray Co., Ltd. under the trade name of "RC-4 50PFD" (2,5-bis(t-butyl peroxy)-2,5-dimethylhexane) and 100.8 parts by mass of a magnetic filler were kneaded, and the magnetic fillers were uniformly dispersed.

An elastomer sheet having a thickness of 1 mm was obtained by curing it for 10 minutes at 170° C. with a press machine, and then secondary curing it for 2 hours in an oven at 200° C. A silicone elastomer was obtained by magnetizing the resulting silicone elastomer sheet at 1.3 T. In this case, magnetic fillers were uniformly dispersed in the resulting silicone elastomer.

With respect to the resulting silicone elastomer, the uneven distribution degree and sensor sensitivity were measured as described in Example 1. The results thereof are shown in Table 1.

Example 5

A silicone elastomer was obtained as described in Example 3 except for changing the amount of the magnetic filler to 5 parts by mass.

With respect to the resulting silicone elastomer, the uneven distribution degree and sensor sensitivity were measured as described in Example 1. The results thereof are shown in Table 1.

Example 6

A silicone elastomer was obtained as described in Example 3 except for changing the amount of the magnetic filler to 350 parts by mass.

With respect to the resulting silicone elastomer, the uneven distribution degree and sensor sensitivity were measured as described in Example 1. The results thereof are shown in Table 1.

TABLE 1

|  |  | Example | | | |
|---|---|---|---|---|---|
|  |  | 1 | 2 | 3 | 4 |
| Formulation | | | | | |
| Isocyanate-terminated prepolymer | *1 | 59 | 59 | — | — |
| Preminol 7001 | *2 | 33 | 33 | — | — |
| Excenol 1020 | *3 | 8 | 8 | — | — |
| Lead octoate | *4 | 0.06 | 0.06 | — | — |
| DY35-1106A | *5 | — | — | 50 | 50 |
| DY35-1106B | *6 | — | — | 50 | 50 |
| DY32-1000U | *7 | — | — | — | — |
| RC-4 50PFD | *8 | — | — | — | — |
| MF-15P | *9 | 100 | — | 100 | 100 |
| SmFeN-alloy powder | *10 | — | 100 | — | — |
| Toluene |  | 120 | 120 | 120 | 60 |
| Condition | | | | | |
| Unevenly distributing treatment time (min) | | 120 | 120 | 120 | 60 |
| Uneven distribution degree | | 62.5 | 58.3 | 57.8 | 26.2 |
| Properties | | | | | |
| Sensor sensitivity | | 0.65 | 0.63 | 0.58 | 0.29 |

|  |  | Example | | Comparative Example | |
|---|---|---|---|---|---|
|  |  | 5 | 6 | 1 | 2 |
| Formulation | | | | | |
| Isocyanate-terminated prepolymer | *1 | — | — | — | — |
| Preminol 7001 | *2 | — | — | — | — |
| Excenol 1020 | *3 | — | — | — | — |
| Lead octoate | *4 | — | — | — | — |
| DY35-1106A | *5 | 50 | 50 | 50 | — |
| DY35-1106B | *6 | 50 | 50 | 50 | — |
| DY32-1000U | *7 | — | — | — | 100 |
| RC-4 50PFD | *8 | — | — | — | 0.8 |
| MF-15P | *9 | 5 | 350 | 100 | 100.8 |
| SmFeN-alloy powder | *10 | — | — | — | — |
| Toluene |  | 120 | 120 | 60 | — |
| Condition | | | | | |
| Unevenly distributing treatment time (min) | | 60 | 60 | 0 | — |
| Uneven distribution degree | | 80.4 | 2.8 | 0.7 | 0.2 |
| Properties | | | | | |
| Sensor sensitivity | | 0.23 | 0.20 | 0.09 | 0.02 |

(Bending Sensor)

Example 7

A silicone elastomer was obtained as described in Comparative Example 2. By using the silicone elastomer, the uneven distribution degree was measured according to the following uneven distribution degree evaluation. In addition, by using a Hall element as a magnetic sensor, the properties of the bending sensor were evaluated according to the bending sensor properties evaluation. The results thereof are shown in Table 2. With respect to the uneven distribution degree, the unevenly distributing treatment time is also shown therein. In Example 7, the magnetic filler was homogeneously dispersed by kneading and the unevenly distributing treatment was not performed, and the unevenly distributing treatment time is 0.

Example 8

A polyurethane elastomer was obtained as described in Example 1. By using the resulting polyurethane elastomer, the uneven distribution degree was measured and the properties of the bending sensor were evaluated as described in Example 7. The results thereof are shown in Table 2. In addition, the total sensor output determined from measured values of magnetic sensors A, B and C was plotted in FIG. 4.

Example 9

A urethane elastomer was obtained as described in Example 2. By using the resulting urethane elastomer, the uneven distribution degree was measured and the properties of the bending sensor were evaluated as described in Example 7. The results thereof are shown in Table 2. In addition, the total sensor output determined from measured values of magnetic sensors A, B and C was plotted in FIG. 4.

Example 10

A silicone elastomer was obtained as described in Example 3. By using the resulting silicone elastomer, the uneven distribution degree was measured and the properties of the bending sensor were evaluated as described in Example 7. The results thereof are shown in Table 2. In addition, the total sensor output determined from measured values of magnetic sensors A, B and C was plotted in FIG. 4.

Example 11

A silicone elastomer was obtained as described in Example 4. By using the resulting silicone elastomer, the uneven distribution degree was measured and the properties of the bending sensor were evaluated as described in Example 7. The results thereof are shown in Table 2. In addition, the total sensor output determined from measured values of magnetic sensors A, B and C was plotted in FIG. 4.

Example 12

A silicone elastomer was obtained as described in Example 5. By using the resulting silicone elastomer, the uneven distribution degree was measured and the properties of the bending sensor were evaluated as described in Example 7. The results thereof are shown in Table 2. In addition, the total sensor output determined from measured values of magnetic sensors A, B and C was plotted in FIG. 4.

Example 13

A silicone elastomer was obtained as described in Example 6. By using the resulting silicone elastomer, the uneven distribution degree was measured and the properties of the bending sensor were evaluated as described in Example 7. The results thereof are shown in Table 2. In addition, the total sensor output determined from measured values of magnetic sensors A, B and C was plotted in FIG. 4.

Example 14

A silicone elastomer was obtained as described in Comparative Example 1. By using the resulting silicone elastomer, the uneven distribution degree was measured and the properties of the bending sensor were evaluated as described in Example 7. The results thereof are shown in Table 2. In addition, the total sensor output determined from measured values of magnetic sensors A, B and C was plotted in FIG. 4.

Comparative Example 3

A silicone elastomer was obtained as described in Comparative Example 2. By using the resulting silicone elastomer, the properties of the bending sensor were evaluated. A magnetic sensor was only set at the position 10 (magnetic sensor A) and the magnetic sensor was not set at the position 11 (magnetic sensor B) and 12 (magnetic sensor C).

TABLE 2

|  |  | Example | | | | |
|---|---|---|---|---|---|---|
|  |  | 7 | 8 | 9 | 10 | 11 |
| Formulation | | | | | | |
| DY32-1000U | *7 | 100 | — | — | — | — |
| RC-4 50PFD | *8 | 0.8 | — | — | — | — |
| Isocyanate-terminated prepolymer | *1 | — | 59 | 59 | — | — |
| Preminol 7001 | *2 | — | 33 | 33 | — | — |
| Excenol 1020 | *3 | — | 8 | 8 | — | — |
| Lead octoate | *4 | — | 0.06 | 0.06 | — | — |
| DY35-1106A | *5 | — | — | — | 50 | 50 |
| DY35-1106B | *6 | — | — | — | 50 | 50 |
| MF-15P | *9 | 100.8 | 100 | — | 100 | 100 |
| SmFeN-alloy powder | *10 | — | — | 100 | — | — |
| Toluene |  | — | 120 | 120 | 120 | 60 |
| Condition | | | | | | |
| Unevenly distributing treatment time (min) |  | — | 120 | 120 | 120 | 60 |
| Uneven distribution degree |  | 0.2 | 62.5 | 56.3 | 57.8 | 26.2 |
| Properties | | | | | | |
| Sensor sensitivity A |  | 0.98 | 15.10 | 13.08 | 14.60 | 12.94 |
| Sensor sensitivity B |  | 0.89 | 8.59 | 6.88 | 7.99 | 6.31 |
| Sensor sensitivity C |  | 0.71 | 4.18 | 3.34 | 3.68 | 3.48 |
| Total sensor output |  | 2.58 | 27.87 | 23.30 | 26.27 | 22.73 |

|  |  | Example | | | Comparative Example |
|---|---|---|---|---|---|
|  |  | 12 | 13 | 14 | 3 |
| Formulation | | | | | |
| DY32-1000U | *7 | — | — | — | 100 |
| RC-4 50PFD | *8 | — | — | — | 0.8 |
| Isocyanate-terminated prepolymer | *1 | — | — | — | — |
| Preminol 7001 | *2 | — | — | — | — |
| Excenol 1020 | *3 | — | — | — | — |
| Lead octoate | *4 | — | — | — | — |

TABLE 2-continued

| | | | | | |
|---|---|---|---|---|---|
| DY35-1106A | *5 | 50 | 50 | 50 | — |
| DY35-1106B | *6 | 50 | 50 | 50 | — |
| MF-15P | *9 | 5 | 350 | 100 | 100.8 |
| SmFeN-alloy powder | *10 | — | — | — | — |
| Toluene | | 120 | 120 | 60 | — |
| Condition | | | | | |
| Unevenly distributing treatment time (min) | | 60 | 60 | 0 | — |
| Uneven distribution degree | | 80.4 | 2.8 | 0.7 | 0.2 |
| Properties | | | | | |
| Sensor sensitivity A | | 6.34 | 7.34 | 1.28 | 0.98 |
| Sensor sensitivity B | | 3.81 | 4.31 | 0.99 | — |
| Sensor sensitivity C | | 2.10 | 2.40 | 0.81 | — |
| Total sensor output | | 12.24 | 14.04 | 3.07 | 0.98 |

(The Tactile Sensors and Bending Sensors)

Example 15

A urethane magnetic elastomer was obtained as described in Example 1. The viscosity of the mixed solution of magnetic elastomer formulation shown in the following Table 3 was 1000 mPa·sec.

Example 16

A silicone magnetic elastomer was obtained as described in Example 3. The viscosity of the mixed solution of magnetic elastomer formulation shown in the following Table 3 was 1200 mPa·sec.

Example 17

The viscosity of the mixed solution was adjusted to 42,000 mPa·sec by using the raw materials as described in Example 16 except for changing the total amount of toluene from 120 parts by mass (60 parts by mass per each) to 60 parts by mass (30 parts by mass per each).

Example 18

A silicone magnetic elastomer was obtained by using the raw materials as described in Example 16 except for treating it in magnetic field of 5 mT (using a neodymium magnet) at room temperature for 120 minutes as a treatment of unevenly distributing the magnetic fillers.

Comparative Example 4

The viscosity of the mixed solution was adjusted to 60,000 mPa·sec by using the raw materials as described in Example 16 except for changing the total amount of toluene to 10 parts by mass (5 parts by mass per each).

Comparative Example 5

A silicone magnetic elastomer sheet was obtained as described in Comparative Example 2.

TABLE 3

| Magnetic elastomer composition | Example | | | | Comparative Example | |
|---|---|---|---|---|---|---|
| | 15 | 16 | 17 | 18 | 4 | 5 |
| Isocyanate-terminated prepolymer *1 | 59 | — | — | — | — | — |
| Preminol 7001 *2 | 33 | — | — | — | — | — |
| Excenol 1020 *3 | 8 | — | — | — | — | — |
| Lead octoate *4 | 0.06 | — | — | — | — | — |
| DY35-1106A *5 | — | 50 | 50 | 50 | 50 | — |
| DY35-1106B *6 | — | 50 | 50 | 50 | 50 | — |
| DY32-1000U *7 | — | — | — | — | — | 100 |
| RC-4 50P FD *8 | — | — | — | — | — | 0.8 |
| MF15P *9 | 100 | 100 | 100 | 100 | 100 | 100.8 |
| Toluene | 120 | 120 | 60 | 120 | 10 | |

*1: Isocyanate-terminated prepolymer synthesized from 40 parts by mass of "Preminol 7001", 60 parts by mass of "Excenol 3020" and 10 parts by mass of "Cosmonate T-80" as described in Example 1
*2: Polypropylene glycol commercially available from Asahi Glass Co., Ltd. under the trade name "Preminol 7001" (number average molecular weight: 6,000)
*3: Polypropylene glycol commercially available from Asahi Glass Co., Ltd. under the trade name "Excenol 1020" (number average molecular weight: 1,000)
*4: Lead octoate, commercially available from Toei Chemical Industry Co., Ltd,
*5: Main agent of two-component liquid silicone rubber, commercially available from Dow Corning Toray Co., Ltd. under the trade name of "DY35-1106A"
*6: Curing agent of two-component liquid silicone rubber, commercially available from Dow Corning Toray Co., Ltd. under the trade name of "DY35-1106B"
*7: Millable type (heat curing type) silicone rubber, commercially available from Dow Corning Toray Co., Ltd. under the trade name of "DY32-1000U"
*8: 2,5-bis(t-butyl peroxy)-2,5-dimethylhexane (crosslinking agent), commercially available from Dow Corning Toray Co., Ltd. under the trade name of "RC-4 50PFD"
*9: Neodymium-based magnetic substance powder (magnetic filler) having an average particle size of 133 Mm commercially available from Aichisteel Corporation under the trade name of "MF-15P"
*10: Samarium-based magnetic filler (SmFeN-alloy powder)

With respect to the resulting magnetic elastomer, the uneven distribution of the magnetic filler in the magnetic elastomer and sensor sensitivity were measured as described in Example 15. The results are shown in Table 4 together with the viscosity of the mixed solution of the thermosetting elastomer precursor solution with the magnetic filler. The test methods are as follows.

(Test Method)
(1) Viscosity Measurement

The viscosity of the mixed solution of the thermosetting elastomer precursor solution with a magnetic filler was measured according to JIS K-7117-1.

(2) Uneven Distribution Degree Evaluation

A sample was cut from the resulting magnetic elastomer with a razor blade, a cross-section of the sample was observed using a digital microscope at a magnification of 100. Using an image analysis software ("WinROOF" from Mitani Corporation), the obtained image was divided into three equal parts in the thickness direction, that is, an upper layer, middle layer and lower layer, and the number of particles of magnetic filler in each layer was counted. An abundance ratio of the magnetic filler in each layer was determined by calculating a ratio of the number of particles of each layer to that of the middle layer. In addition, the uneven distribution degree was determined by calculating a value of [(the abundance ratio of the magnetic filler in the upper layer)−(the abundance ratio of the magnetic filler in the lower layer)]. As used herein, the upper layer is the layer on the side of the contact surface in the tactile sensor shown in FIG. 1 and the layer on the upper side in the bending sensor shown in FIG. 2.

(3) Tactile Sensor Characteristics Evaluation

A Hall element (linear Hall IC containing a Hall element and an amplifier circuit in one package commercially available under the trade name of "EQ-430L" from Asahi Kasei Electronics Co., Ltd.) was mounted on a substrate as a magnetic sensor, and a magnetic elastomer was placed on the surface of the substrate opposite to the side of the mounted magnetic sensor as shown in FIG. 1. At this time, the magnetic elastomer is placed such that a surface, on which magnetic fillers are unevenly distributed, is the contact surface, to which pressure is applied. An output voltage of the Hall element when applying a pressure of 30 kPa thereto using a compression testing machine ("Autograph" manufactured by Shimadzu Corporation) was read, and the tactile sensor characteristics were evaluated from a change rate of the output voltage ($\Delta V_{out}$) as a sensor sensitivity.

(4) Bending Sensor Characteristics Evaluation

Three Hall elements ("EQ-430L" from Asahi Kasei Electronics Co., Ltd.) were mounted on a magnetic elastomer as a magnetic sensor as shown in FIG. 3. In FIG. 3, "10" is the magnetic sensor A, "11" is the magnetic sensor B, "12" is a magnetic sensor C and characteristics of the bending sensor were obtained by bending an end part 14 of elastomer 13 in the direction shown by the arrow 15 and reading an output voltage of the magnetic sensor at each angle 16 in the direction shown by the arrow. In addition, the sum of a change rate value of the output voltage of each Hall element at a bending angle of 90 degrees, which is a total output of the sensor ($\Delta V_{out}$) as an index is shown in Table 1 as an evaluation of the sensor sensitivity. It is considered that the sensor sensitivity is good as the sum of the change rate value of the output voltage of the sensor at a bending angle of 90 degrees becomes high. A graph of the total output of the magnetic sensor at each angle is shown in FIG. 4.

(Test Results)

(1) Tactile Sensor

As is apparent from Table 1, when the uneven distribution degree is high as in Examples 1 to 6, the sensor sensitivity is high. On the other hand, when the uneven distribution degree is lower than 1 as in Comparative Examples 1 and 2, the sensor sensitivity is poor.

(2) Bending Sensor

As is apparent from Table 2, when three magnetic sensors are mounted as in Examples 7 to 14, the total output is high, and the bending sensor characteristics are good. In addition, when the uneven distribution degree is high, the bending sensor characteristics are good. On the other hand, when only one magnetic sensor is mounted as in Comparative Example 3, bending sensor characteristics are reduced.

(3) Tactile Sensor and Bending Sensor

TABLE 4

| Test item | Example | | | | Comparative Example | |
|---|---|---|---|---|---|---|
| | 15 | 16 | 17 | 18 | 4 | 5 |
| Viscosity (mPa · s) | 1000 | 1200 | 42000 | 1200 | 60000 | — |
| Uneven distribution degree of magnetic | 62.5 | 57.8 | 1.5 | 80.7 | 0.6 | 0.2 |
| Tactile sensor sensitivity | 0.65 | 0.58 | 0.20 | 0.70 | 0.05 | 0.02 |
| Bending sensor sensitivity | 27.87 | 26.27 | 6.80 | 30.82 | 3.05 | 2.58 |

As is apparent from the results in Table 4, in the tactile sensors and bending sensors of Examples 15 to 18 obtained by the production method of the present invention, the uneven distribution degree of magnetic fillers in a magnetic elastomer is very large, and the sensor sensitivity is very high as compared with the tactile sensors and bending sensors of Comparative Examples 4 and 5. Among Examples having more excellent performances as the tactile sensor and bending sensor than those of Comparative Examples, in Example 18 which a treatment of unevenly distributing the magnetic fillers is performed by using a magnetic force, the uneven distribution degree of magnetic fillers in a magnetic elastomer is very large, and the sensor sensitivity is very high.

On the other hand, in the tactile sensor and bending sensor of Comparative Examples 4, since the viscosity of the mixture solution of thermosetting elastomer precursor solution with the magnetic fillers in production is very high, it is difficult to unevenly distribute the magnetic fillers in the elastomer. Therefore, the uneven distribution degree is very small, and the sensor sensitivity is very low.

In the tactile sensor and bending sensor of Comparative Examples 5, since the magnet fillers are uniformly distributed in the magnetic elastomer by kneading, the uneven distribution degree of magnetic fillers in the magnetic elastomer is very small, and the sensor sensitivity is very low.

DESCRIPTION OF REFERENCE NUMERALS

1: Elastomer
2: Magnetic sensor
3: Magnetic filler
4: Substrate
5: Pressure
10: Magnetic sensor A
11: Magnetic sensor B
12: Magnetic sensor C
13: Elastomer
14: End part of elastomer
15: Direction of bending the end part of elastomer
16: Angle of bending the end part of elastomer

What is claimed is:
1. A tactile sensor comprising:
an elastomer containing a magnetic filler, and
a magnetic sensor that detects a magnetic change caused by a deformation of the elastomer due to touching, wherein the magnetic filler is unevenly distributed in the elastomer and an uneven distribution degree of the magnetic filler in the elastomer is within the range of 1 to 100.

2. The tactile sensor according to claim 1, wherein the magnetic filler is unevenly distributed on one side of the elastomer and an uneven distribution surface is used as a contact surface.

3. The tactile sensor according to claim 1, wherein the magnetic filler is rare earth-based, Fe-based, Co-based, Ni-based, or an oxide-based filler, and has an average particle size of 0.02 to 500 μm.

4. The tactile sensor according to claim 1, wherein the magnetic filler is added in an amount of 1 to 450 parts by mass, based on 100 parts by mass of the elastomer.

5. The tactile sensor according to claim 1, wherein the elastomer is a polyurethane elastomer or a silicone elastomer.

6. A bending sensor comprising:
an elastomer containing a magnetic filler, and
two or more magnetic sensors that detect a magnetic change caused by a bending deformation of the elastomer,
wherein the magnetic filler is unevenly distributed in the elastomer and an uneven distribution degree of the magnetic filler in the elastomer is within the range of 1 to 100.

7. The bending sensor according to claim 6, wherein the magnetic filler is unevenly distributed on one side of the elastomer and the two or more magnetic sensors are placed on the opposite side of an uneven distribution surface.

8. The bending sensor according to claim 7, wherein the magnetic filler is rare earth-based, Fe-based, Co-based, Ni-based, or an oxide-based filler, and has an average particle size of 0.02 to 500 μm.

9. The bending sensor according to claim 6, wherein the magnetic filler is added in an amount of 1 to 450 parts by mass, based on 100 parts by mass of the elastomer.

10. The bending sensor according to claim 6, wherein the elastomer is a polyurethane elastomer or a silicone elastomer.

11. A method of making a sensor comprising an elastomer containing a magnetic filler and a magnetic sensor, the method comprising the steps of:
(i) mixing the magnetic filler and a thermosetting elastomer precursor solution to form a mixed solution,
(ii) molding the mixed solution into a sheet,
(iii) unevenly distributing the magnetic filler in the thermosetting elastomer precursor solution,
(iv) heating and curing the thermosetting elastomer precursor solution to form an elastomer sheet, and
(v) magnetizing the magnetic filler to form a magnetic elastomer,
wherein the mixed solution formed in the step (i) has a viscosity of 100 to 50,000 mPa·sec, an uneven distribution degree of the magnetic filler unevenly distributed in the step (iii) in the elastomer is within the range of 1 to 100.

12. The method according to claim 11, wherein the step (iii) of unevenly distributing the magnetic filler is performed by applying a magnetic field having a magnetic flux density of 1 to 3000 mT.

13. The method according to claim 11, wherein the magnetic filler is unevenly distributed on one side and the magnetic sensor is placed on the opposite side of an uneven distribution surface.

14. The method according to claim 11, wherein the magnetic filler is rare earth-based, Fe-based, Co-based, Ni-based, or an oxide-based filler, and has an average particle size of 0.02 to 500 μm.

15. The method according to claim 11, wherein the magnetic filler is added in an amount of 1 to 450 parts by mass, based on 100 parts by mass of the elastomer.

16. The method according to claim 11, wherein the elastomer is a polyurethane elastomer or a silicone elastomer.

* * * * *